(12) United States Patent
Hartwell (10) Patent No.: US 9,427,662 B2
(45) Date of Patent: *Aug. 30, 2016

(54) METHODS AND SYSTEMS FOR PROVIDING IN-GAME HOT SPOTS

(71) Applicant: GOSUB 60, Inc., Santa Monica, CA (US)

(72) Inventor: Joshua Hartwell, Santa Monica, CA (US)

(73) Assignee: GOSUB 60, INC., Santa Monica, CA (US)

( * ) Notice: Subject to any disclaimer, the term of this patent is extended or adjusted under 35 U.S.C. 154(b) by 65 days.

This patent is subject to a terminal disclaimer.

(21) Appl. No.: 14/180,890

(22) Filed: Feb. 14, 2014

(65) Prior Publication Data

US 2014/0162784 A1    Jun. 12, 2014

Related U.S. Application Data

(63) Continuation of application No. 11/768,890, filed on Jun. 26, 2007, now Pat. No. 8,688,089.

(51) Int. Cl.
| | |
|---|---|
| *A63F 13/12* | (2006.01) |
| *A63F 13/30* | (2014.01) |
| *H04W 4/02* | (2009.01) |
| *H04L 29/08* | (2006.01) |
| *H04L 29/06* | (2006.01) |

(52) U.S. Cl.
CPC .............. *A63F 13/12* (2013.01); *H04L 67/04* (2013.01); *H04L 67/18* (2013.01); *H04L 67/20* (2013.01); *H04L 67/38* (2013.01); *H04W 4/02* (2013.01)

(58) Field of Classification Search
CPC ...................................................... A63F 13/12
See application file for complete search history.

(56) References Cited

U.S. PATENT DOCUMENTS

| | | | |
|---|---|---|---|
| 6,219,696 | B1 | 4/2001 | Wynblatt et al. |
| 6,445,398 | B1 | 9/2002 | Gerba et al. |
| 6,628,939 | B2 | 9/2003 | Paulsen |
| 7,158,798 | B2 | 1/2007 | Lee et al. |

(Continued)

FOREIGN PATENT DOCUMENTS

EP    1087312 A2    3/2001

OTHER PUBLICATIONS

Advisory Action for U.S. Appl. No. 11/76,890, mailed Nov. 22, 2011 (3 pages).

(Continued)

*Primary Examiner* — Omkar Deodhar
(74) *Attorney, Agent, or Firm* — Finnegan, Henderson, Farabow, Garrett & Dunner, LLP (57) ABSTRACT

Systems and methods for providing hot spots for mobile video games on mobile communication devices that receive hot spot information for mobile video games that operate on the devices. The hot spots may be hidden aspects of the game and promotional in nature, allowing game companies to generate extra revenue through selling non-permanent advertisement space to third parties. The game may contain instructions that cause the mobile communication device to contact an interface and/or server to receive hot spot information. After the hot spot information is received by the mobile communication device, the content may be displayed in-game. In addition, the server may track what hot spot information has already been received by the mobile communication device.

20 Claims, 7 Drawing Sheets

(56) References Cited

U.S. PATENT DOCUMENTS

| | | |
|---|---|---|
| 7,575,518 B2 | 8/2009 | Tabata |
| 7,577,978 B1 | 8/2009 | Wistendahl et al. |
| 7,753,791 B2 | 7/2010 | Hartwell |
| 8,246,466 B2 | 8/2012 | Herrmann et al. |
| 8,401,903 B2 | 3/2013 | Lerman et al. |
| 8,688,089 B2 | 4/2014 | Hartwell |
| 2002/0166119 A1 | 11/2002 | Cristofalo |
| 2003/0105669 A1 | 6/2003 | Tsuchiya |
| 2003/0224855 A1 | 12/2003 | Cunningham |
| 2004/0049419 A1 | 3/2004 | Knight |
| 2004/0127279 A1 | 7/2004 | Gatto et al. |
| 2005/0240476 A1 | 10/2005 | Bigott |
| 2006/0111979 A1 | 5/2006 | Chu |
| 2006/0128469 A1 | 6/2006 | Willis et al. |
| 2006/0130046 A1 | 6/2006 | O'Neill |
| 2006/0136297 A1 | 6/2006 | Willis et al. |
| 2006/0205510 A1 | 9/2006 | Lauper et al. |
| 2007/0022442 A1 | 1/2007 | Gil et al. |
| 2007/0242645 A1 | 10/2007 | Stephenson et al. |
| 2008/0102956 A1 | 5/2008 | Burman et al. |
| 2008/0109528 A1 | 5/2008 | Knight et al. |
| 2009/0007186 A1 | 1/2009 | Hartwell |
| 2009/0156179 A1 | 6/2009 | Hahn et al. |
| 2010/0291907 A1 | 11/2010 | Macnaughtan et al. |
| 2013/0282454 A1 | 10/2013 | Alpert et al. |

OTHER PUBLICATIONS

Final Office Action for U.S. Appl. No. 11/768,890, mailed Aug. 2, 2011 (12 pages).
Final Office Action for U.S. Appl. No. 11/768,892, mailed Jun. 5, 2013 (8 pages).
International Search Report and the Written Opinion of the International Searching Authority, or the Declaration; International Application No. PCT/US08/68249; International Filing Date Jun. 25, 2008 (8 pages).
International Search Report and the Written Opinion of the International Searching Authority, or the Declaration; International Application No. PCT/US08/68250; International Filing Date Jun. 25, 2008 (8 pages).
Notice of Allowance for U.S. Appl. No. 11/768,890, mailed Nov. 14, 2013 (9 pages).
Notice of Panel Decision from Pre-Appeal Brief Review for U.S. Appl. No. 11/768,892, mailed Oct. 22, 2013 (2 pages).
Office Action for U.S. Appl. No. 11/768,890, mailed May 6, 2010 (8 pages).
Office Action for U.S. Appl. No. 11/768,890, mailed Sep. 30, 2010 (8 pages).
Office Action for U.S. Appl. No. 11/768,890, mailed Feb. 2, 2011 (9 pages).
Office Action for U.S. Appl. No. 11/768,890, mailed Mar. 13, 2013 (9 pages).
Office Action for U.S. Appl. No. 11/768,892, mailed Sep. 10, 2012 (8 pages).
Office Action for U.S. Appl. No. 11/768,892, mailed Jan. 4, 2013 (6 pages).
Office Action for U.S. Appl. No. 11/768,892, mailed Mar. 25, 2014 (9 pages).
PCT Notification Concerning Transmittal of International Preliminary Report on Patentability; International Application No. PCT/US/2008/068250; Jan. 14, 2010 (7 pages).
PCT Notification Concerning Transmittal of International Preliminary Report on Patentability; International Application No. PCT/US/2008/068249; Jan. 14, 2010 (6 pages).
U.S. Appl. No. 11/768,892, filed Jun. 26, 2007.

METHODS AND SYSTEMS FOR PROVIDING IN-GAME HOT SPOTS

This application is a continuation of U.S. application Ser. No. 11/768,890, filed Jun. 26, 2007, which is hereby incorporated by reference herein in its entirety.

DESCRIPTION OF THE INVENTION

1. Field of the Invention

The invention relates generally to systems and methods for providing in-game hot spots to a mobile communication device.

2. Background of the Invention

Many mobile communication devices (including cellular phones, PDAs, and other handheld devices capable of communicating with a server) are capable of operating video games. Most current mobile communication devices come equipped with one or more games at the time of purchase, and most modern mobile communication devices also allow users to download and/or purchase new games. As mobile communication device technology has advanced, the games available for these devices have become more robust. For example, most current mobile communication devices include color screens that can support games with detailed color graphics, and more content may generally fit onto these screens than on screens of older mobile devices. As a result, gaming on mobile communication devices has become a popular mode of entertainment in a mobile environment.

However, all video games tend to have a popularity life span. As game elements become increasingly familiar to players, the game may hold less surprises and/or no longer present a challenge to the user, at which point the user may stop playing that particular game in favor of others. Because mobile communication devices are generally less powerful than personal computers and stand-alone video game consoles, some games for mobile communication devices may be relatively simple or repetitive by comparison. Typically, games that hold user interest for longer periods of time are more valuable than games that users leave behind quickly. As a result, game creators are always looking for ways to make games that hold the user's interest for a longer period of time.

The recent surge in technical capabilities of mobile communication devices has also spawned attractive new promotional possibilities. Because an extremely large number of people worldwide own mobile communication devices, many third parties may wish to advertise within the screen of a mobile communication device. In particular, when a user plays a game on the mobile communication device, the user's full attention may be directed to the screen of the mobile communication device. Therefore, providing in-game advertising space in the palm of the user's hand is an attractive proposition for both buyers and sellers of the space.

Permanent advertisements within a video game that is played on a mobile communication device may be presented in various ways. For example, the background of the video game might contain a permanent advertisement for a third party. In most cases, this advertisement would generate revenue for the maker of the game, while also serving as a valuable promotional opportunity for the third party.

It is accordingly an object of the invention to provide systems and methods for providing hot spots of triggered content within the gaming environment of a mobile video game on a mobile communication device. A hot spot can be thought of as a location or item, sometimes hidden within the game, that triggers additional specialized content when activated by a user or some other in-game element. Some embodiments may prolong user interest in a game for a mobile communication device, and make promotional opportunities more predictable and/or desirable, as follows.

SUMMARY OF THE INVENTION

In accordance with embodiments of the invention, systems and methods for providing in-game hot spots on a mobile communication device are provided.

In an embodiment, a mobile communication device may comprise a screen for viewing by the user, a processor, and a memory. The memory may contain instructions that, when executed by the processor, cause the communications device to operate a video game, contact a remote system to check for hot spot information to use in the video game, download the hot spot information to the communications device from a server, designate a location in-game for activating the hot spot, detect manipulation of the designated location as activating the hot spot; and display content when the user activates the hot spot. The video game itself may be presented on the screen.

A hot spot is an in-game feature that includes an activation element and a content element that is triggered by the activation element. The downloaded hot spot information may include one or both of the elements. The mobile communication device may update the hot spot information periodically by contacting the remote system.

The activation element may comprise an area location or an item, sometimes hidden in the game, that can be triggered by a user or some other in-game element. For example, the hot spot information may include coordinate information, and the coordinate information may be used to designate the location for activating the hot spot. In some embodiments, the designated location is an item that is displayed in-game.

In some embodiments, the hot spot information identifies the content (i.e., "content element") to be displayed when the hot spot is activated. The content may include, for example, a message, and the message may be promotional. In some embodiments, the message includes a hint related to the game. Other content that can be triggered by a hot spot includes a new game level or an item useful in playing the game. The content triggered by a first hot spot can also include another hot spot that is then placed within the game. The content may be promotional in nature, but can also be non-promotional.

Another embodiment disclosed herein includes a computer-readable medium containing instructions for execution by a mobile communication device. The instructions may cause the mobile communication device to operate a video game, contact a server to check for hot spot information for use in the video game, download the hot spot information to the communications device, designate a location in-game for activating the hot spot, detect manipulation of the designated location as activating the hot spot, and display content when the user activates the hot spot.

A method for distributing hot spot information to a communications device for use in a video game that runs on the communications device is disclosed herein. In an embodiment, the method may comprise the steps of storing hot spot information on a computer-readable medium, receiving a request for hot spot information from a mobile communication device, the hot spot information being usable in a video-game that already exists on the communications device, and uploading hot spot information to the communications device, the hot spot information identifying content for presenting to the user when the hot spot is activated.

The hot spot information may designate a location in-game for activating the hot spot. In one case, the location may be fixed to a particular item, and therefore may be subject to the movement and/or boundaries of the item.

In addition, the method may include tracking what hot spot information has been downloaded.

Further, some embodiments may include a system for distributing updated video game content to a communications device. The system may comprise a storage medium for storing hot spot information for use in a video game, a server in communication with the storage medium, and an interface coupled to the server and a network, wherein the interface receives a request for hot spot information from the communications device over the network. In some systems, the server may be operative to receive a request through the interface and utilize the request to send the hot spot information from the storage medium to the communications device, the hot spot information designating an location in-game as associated with activating the hot spot.

The hot spot information may identify content for presenting to the user when the hot spot is activated, and the content may be promotional in nature. In some embodiments, the content is pre-selected by the server based on a model type associated with the communications device, a service subscription associated with the communications device, or a service provider for the service subscription associated with the communications device.

The server may track what hot spot information has been downloaded.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and together with the description, serve to explain the principles of the invention.

DESCRIPTION OF THE EMBODIMENTS

Reference will now be made in detail to the present exemplary embodiments of the invention, examples of which are illustrated in the accompanying drawings. Wherever possible, the same reference numbers will be used throughout the drawings to refer to the same or like parts.

It is to be understood that both the foregoing background description and the following detailed description are exemplary and explanatory only and are not restrictive of the invention as claimed.

As used herein, a server includes any remote system capable of receiving communication from a handheld device over a network, such as the Internet, intranet, local area network, telecommunications network, and/or Ethernet.

This application incorporates by reference herein in its entirety the U.S. patent application entitled "Systems and Methods for Updating In-Game Content," filed on Jun. 26, 2007, as U.S. application Ser. No. 11/768,892.

Generally, a hot spot is an in-game feature that includes an activation element and a content element that is triggered by the activation element. Hot spot information may include information that allows a mobile communication device to designate a location in-game (such as an item or hidden area) for activating the hot spot. When the location is electronically manipulated in some way during game play, such as by touching it, running over it, hitting it with an item, etc., the content associated with the hot spot may be displayed. For example, the content may be a promotional message.

An embodiment of the invention described below allows a game company and/or provider to provide hot spots via hot spot information to a mobile communication device for use in a mobile video game that operates on the mobile communication device. The ability to provide hot spots and update in-game hot spot information may allow game companies to keep game elements fresh and prolong user enjoyment of the game. For example, new interactive items and/or hidden features may be placed within a particular scene in the game so that the user has something new to look at or trigger (sometimes unexpectedly). In addition, the game company may charge third-party advertisers a fee per downloaded and/or activated hot spot in one aspect. Consequently, the game may sustain its popularity and be more profitable for the game creator than existing mobile communication device games.

The game may also attract more third-party advertisers by providing an avenue for purchasing and selling time blocks of in-game advertising. Third parties may now have the option to advertise for a period of time, rather than permanently, within a video game for a mobile communication device. This flexibility may allow the negotiation of promotional contracts that involve less guess-work with respect to placing advertisements or virtual products within a video game on a mobile communication device. Further, an embodiment herein also provides promotional opportunities for third parties that could not previously afford to place advertisements within a game for a mobile communication device. For example, while purchasing a promotional spot that lasts the lifetime of the game may not be feasible, it may be much cheaper to purchase a smaller block of time for content used in a hot spot over that smaller block of time.

In some embodiments, advertisements may be tracked on a per-view or per-download basis. In these embodiments, it may be possible for the game company and/or distributor to profit each time a promotional hot spot is downloaded. Some embodiments may track each time a hot spot is activated and/or viewed. In one aspect, a mobile communications device may maintain a continuous link with a remote system while the game is operating, allowing the system to track the number of times a hot spot is activated. In another embodiment, no continuous link exists, but the mobile communication device may periodically report hot spot activation statistics to the remote system.

In addition, local third party advertisers may be able to place promotional content on mobile communication devices located within a proximity to the locality.

The ability to place or update a hot spot within the game may also provide an avenue for signing additional promotional contracts after the game has already been publicly released. For example, in a previously-released game, a new hot spot location may be placed in-game (i.e., as part of the gaming environment of the mobile video game) that was not present at the time of the game's launch. Alternatively, an item and/or message associated with an existing hot spot may be changed. Similarly, the location of a hot spot may vary, maintaining an element of surprise or newness within the game. The ongoing promotional aspects of such a system could be very attractive to both buyers and sellers of promotional space.

Figure 1:
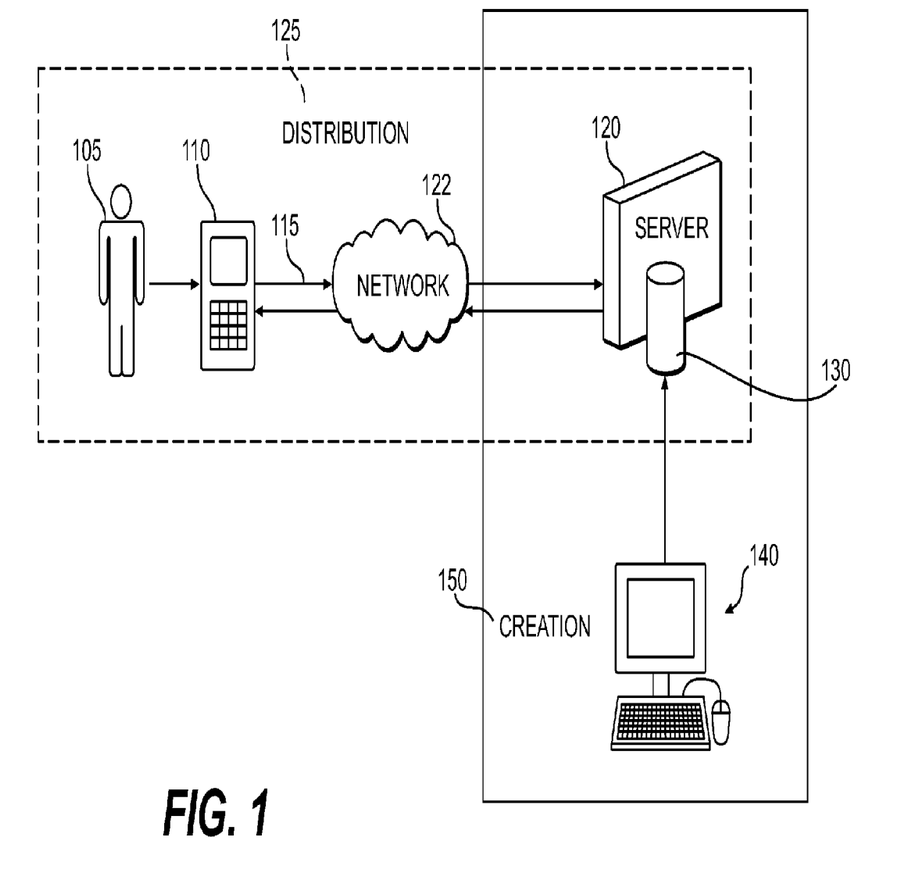
FIG. 1 is an overview diagram of exemplary components used to provide in-game hot spots on a mobile communication device in accordance with some embodiments of the present invention.

FIG. 1 is an overview diagram of exemplary components used to place or update hot spot information on a mobile communication device in accordance with several embodiments of the present invention. Turning to FIG. 1, both a distribution block 125 and a creation block 140 are shown. In the distribution block 125, the user 105 plays a mobile video game on mobile communication device 110. In some embodiments, the game includes instructions to check 115 for hot spot information at server 120. The mobile communication device may perform this check 115 by connecting to server 120 through network 122.

In some embodiments, the mobile communication device 110 may contain a processor and a memory. The program instructions for the video game may be located in the memory and executed by the processor, causing the game to operate on the mobile communication device. The mobile communication device may also contain a screen for displaying the mobile video game to the user 105.

The network 122 may include, for example, the global Internet. Alternatively or in addition, the network 122 may include a phone or data network. In an embodiment, the mobile communication device 110 may connect to an interface (not shown) that may, in turn, pass a request for hot spot information to server 120. The interface may be part of server 120 or a separate device, depending on the embodiment. The interface may also include its own server and/or specialized firewall hardware. In addition, server 120 may actually be one or more servers.

In the example of FIG. 1, hot spot information is stored on a data storage medium 130. In this example, the data storage medium 130 is computer-readable. Potential data storage mediums include a hard drive, memory (such as RAM), and other storage devices (e.g., flash memory, a USB drive, compact disk, DVD, tape, or other media). The data storage medium may be implemented by one or more distinct storage mediums. In some embodiments, the hot spot information may be organized or indexed by a database. The storage medium 130 may be a part of server 120 in some embodiments.

After server 120 receives a communication request from mobile communication device 110, server 120 may check whether hot spot information (or updated hot spot information) is available for one or more mobile video games. If any hot spot information is available, server 120 may send or provide (e.g., upload) the information to mobile communication device 110. Other steps, such as performing a check of whether the user wishes to receive hot spot information, are possible in some embodiments. For example, the server 120 may store an indicator of whether hot spot information should be sent to the particular mobile communication device 110. Additionally, before or after the hot spot information is downloaded, the user 105 may be prompted by mobile communication device 110 to make sure the user 105 wishes to add the hot spot information to the video game.

Other user information may also be utilized, such as the sex, age, or interests of the user. This may help in selecting more appropriate hot spot content for the user. Other checks are also possible, such as the geographic location of the user. In one embodiment, the user may be queried for this information. In another embodiment, the mobile communications device automatically transmits the information to the remote system and/or the remote system stores the information for later use.

Once the hot spot information has been downloaded by mobile communication device 110, the hot spot may be placed in-game (e.g., within the gaming environment). Some hot spots may be initially part of the mobile video games, and hot spot information may replace or supplement previously existing hot spots within the game. For example, the updated hot spot information may change the location of the hot spot, associate the hot spot with a new item, change the content that is displayed when the hot spot is activated, and/or change the method of activating the hot spot.

The hot spot information may be loaded into the server 120 and/or storage medium 130 from any number of external sources (although typical server access restrictions may apply). In FIG. 1, computer 140 may upload the hot spot information to the server 120. In other embodiments, the hot spot information may be created on server 120. In still other embodiments, a user 105 may create a component of the hot spot information. For example, some embodiments may allow the user 110 to upload a recorded message to server 120, either via the mobile communication device 110 or some other device, such as a personal computer. The message may play, for example, when a hot spot is activated. In another embodiment, the user 110 may be able to upload content (such as a picture, movie, text, etc.) to server 120 for sharing with others. Server 120 may distribute user-generated content as part of hot spot information, for example, if the user wins a contest.

The server may be in communication with the storage medium that contains the hot spot information so that the information may be retrieved and sent to the mobile communication device.

Figure 2A:
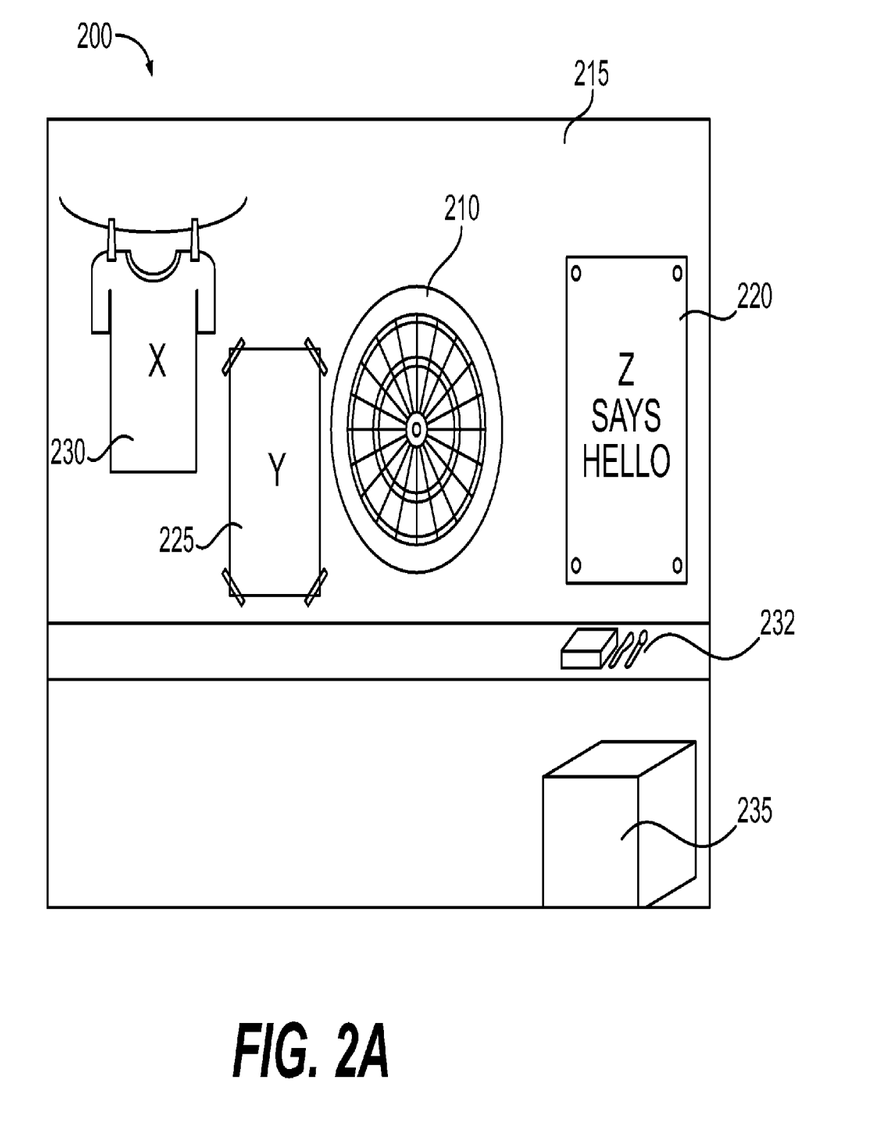
FIGS. 2A-B are diagrams of an exemplary scene in a video game played on a mobile communication device in accordance with some embodiments of the present invention.
Figure 2B:
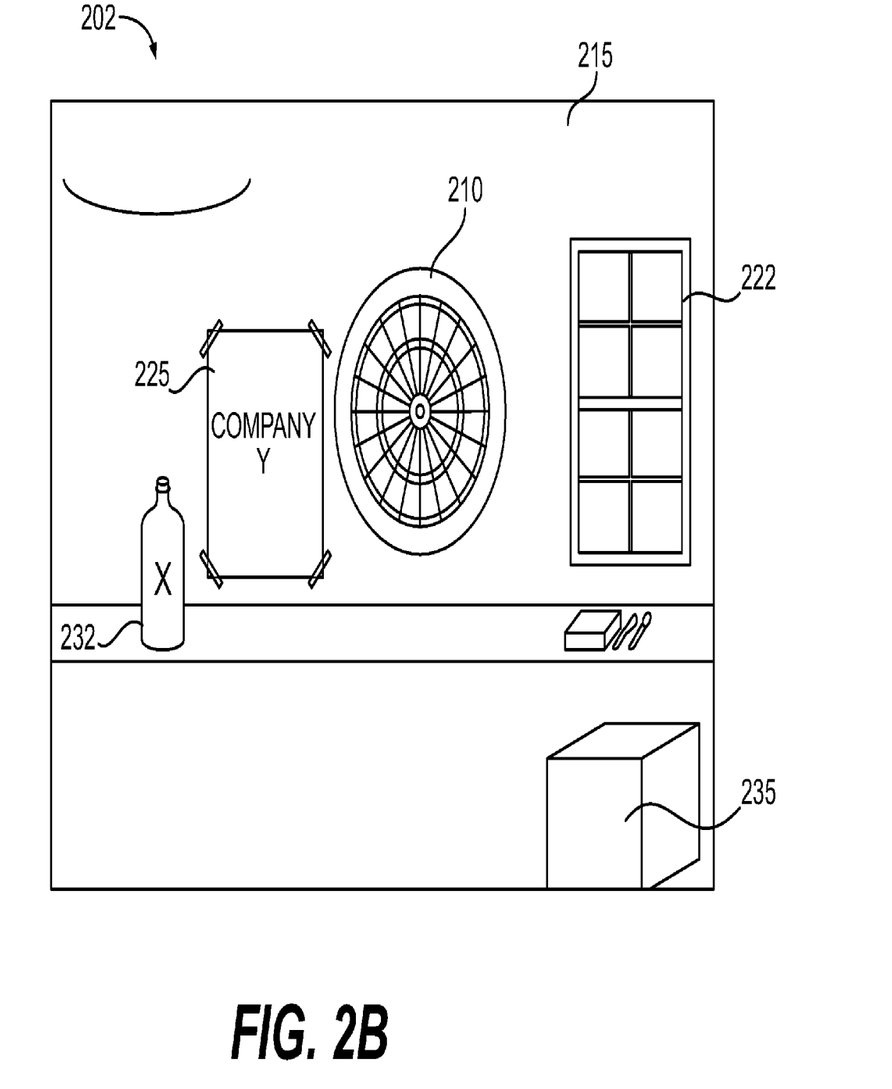

FIGS. 2A and B are diagrams of an exemplary scene in a mobile video game played on a mobile communication device in accordance with several embodiments. The exemplary screen is from a darts game, which includes dart board 210. However, embodiments disclosed herein may benefit all types of mobile communication device games, and are not limited to darts games or any other particular type of game that is available for mobile communication devices.

Turning now to FIG. 2A, several items 210, 220, 225, 230, and 235 are shown within scene 200. In this example, virtually any of these items may be defined as hot spots on the mobile communication device. For instance, if the user throws a dart that hits shirt 230, a promotional message associated with third party X may pop up on screen. A message may include a picture, text, video, audio, or combination thereof. Promotional messages might also be displayed if the user activates hot spots on poster 225 or chalk board 220. Additionally, if the user activates a hot spot defining a piece of chalk 232, a new message might be drawn on chalk board 220.

Thus, hot spots may be provided by designating a location in-game for activating the hot spot, detecting activation of the hot spot during operation of the mobile video game, and displaying content when the hot spot is activated. The designated in-game location for the hot spot may be based on hot spot information. The activation may occur, for example, when the user manipulates the designated location.

New hot spot information availability may be driven by promotional contract terms, such as with third parties exemplified by X, Y, and Z. In this example, when the promotional contract with third party X ends, the logo on shirt 230 and/or associated hot spot message may be removed. In addition, the mobile communication device may update hot spot information by downloading a new message to associate with the shirt 230. The updated message may not be promotional, or it may advertise the in-game availability for promotional content. As an example, the new message displayed when the hot spot on shirt 220 is activated might state that "ad space is available." Localized promotional content used on the hot spot may removed and/or replaced in a shorter time frame if the mobile communication device enters a new local area with different localized promotional content in some embodiments. The content may also include content provided by a friend of the user, or may be geographically selected.

Turning to FIG. 2B, a hot spot may be assigned to window 222. When the user hits the window with a dart, the hot spot may be activated. Activation may cause the mobile communication device to display content, such as an animation of window 222 shattering. Additionally, a promotional message, such as for a window repair company, may be displayed to the user. In this example, the hot spot information may include coordinates for defining the placement and/or boundaries of the window, the window graphic, the shatter animation content, coordinates for displaying the animation, and the promotional message. In some embodiments, some of those components may already exist on the mobile communication device.

Figure 3A:
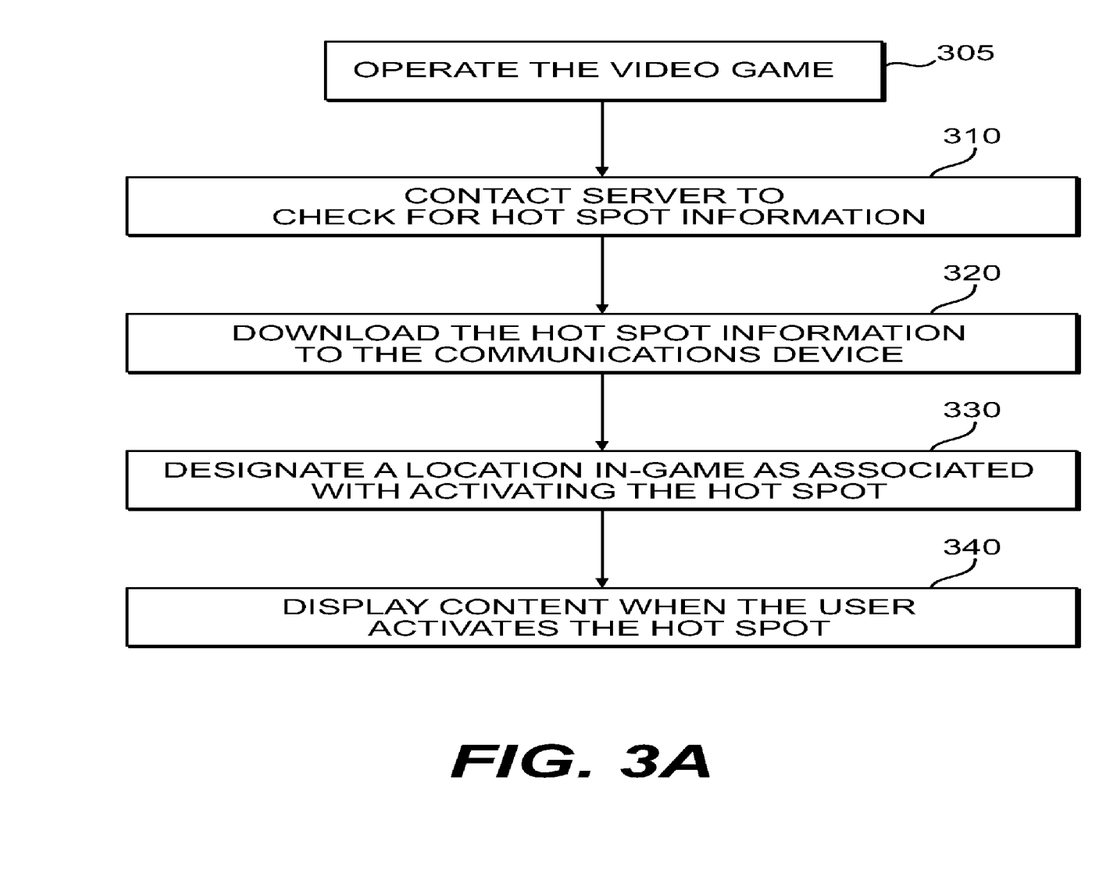
FIGS. 3A-B are exemplary flow charts that include steps taken by a mobile communication device to update in-game hot spot information in accordance with an embodiment of the present invention.
Figure 3B:
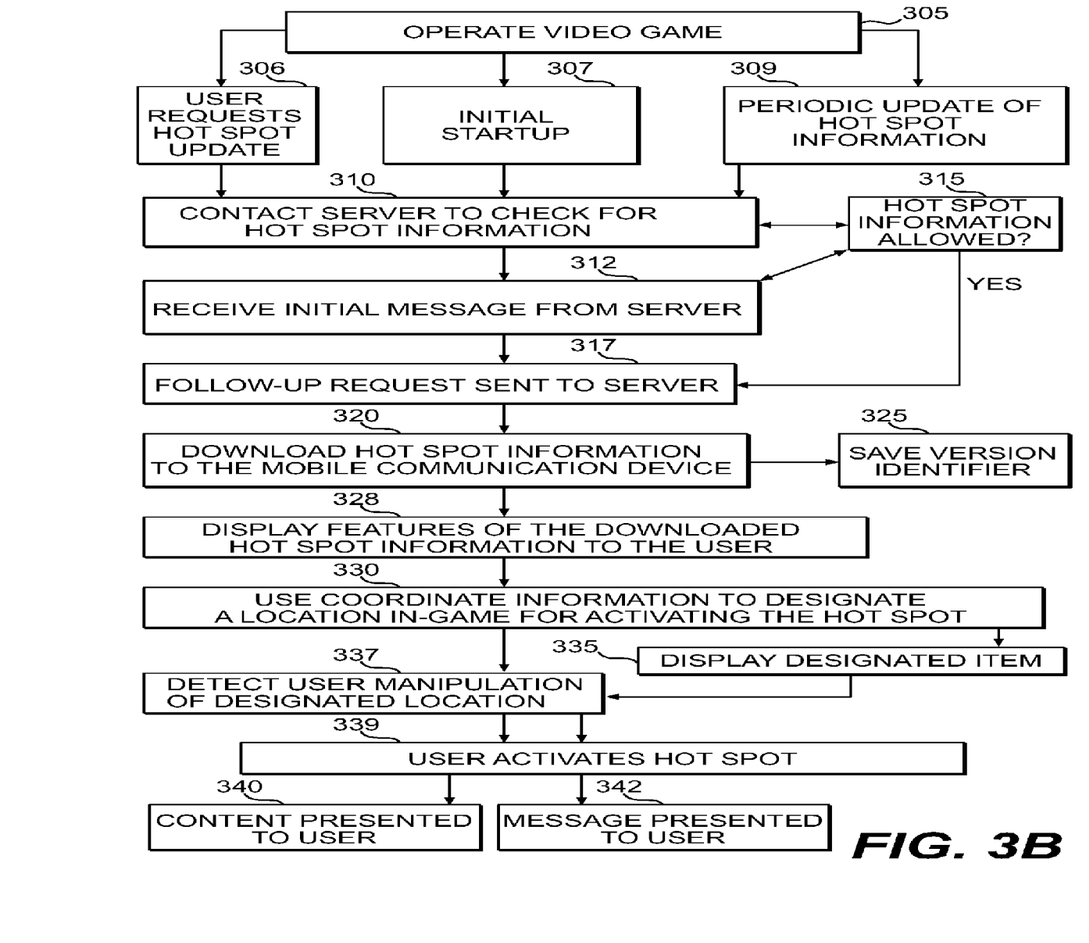

FIGS. 3A-B are exemplary flow charts that include steps taken by a mobile communication device to update hot spot information in accordance with an embodiment of the present invention. Turning to FIG. 3A, the mobile communication device operates a video game at step 305. The video game may be any type of game operable on a mobile communication device.

At step 310, the mobile communication device may contact a server to check for hot spot information to download in one embodiment. As will be explained in more detail with reference to FIG. 3B, contacting the server may be triggered by many different events and occur and occur at many different times, depending on the embodiment. The mobile video game may be concurrently operating in some embodiments, or not operating in other embodiments.

After the server has been contacted, the mobile communication device may begin downloading the hot spot information at step 320. The length of time that passes between contacting the server at 310 and downloading the updated hot spot information varies between embodiments and depends on many factors, some of which are discussed in more detail with reference to FIG. 3B. For example, other communications, such as an authorization to download files or data initiation, may occur before downloading begins in some embodiments. Alternatively or in addition, downloading may be delayed in an embodiment until a time when more bandwidth is available or when downloading will not disrupt game play.

At step 330, the mobile communication device may designate a location in-game as associated with activating the hot spot. The location may be an item or may be unassociated with an item, depending on the embodiment. The exact timing of when the location is designated varies depending on the embodiment. In addition, some embodiments may query whether the user wishes to implement the hot spot before the hot spot location is designated. An embodiment might also include presenting the user with a message explaining the updated hot spot information. For example, before the updated hot spot location is designated, the user might be presented with a message that states "x would like to hide a game tip in this room". In some of those embodiments, the user may have the option of accepting or declining the hot spot implementation.

At step 340, the mobile communication device may display the content associated with the hot spot within the video game (i.e., in-game). For example, a promotional jingle may play when the user touches the bottle 232 from FIG. 2B. The content may include a message, such as "Drink X—it is good for you!" The associated content may also be displayed in a pop-up window. Pop-up windows that are spawned from the operation of the game are considered to be in-game for the purpose of this disclosure, even if a separate website is spawned.

Turning now to FIG. 3B, a more elaborate set of steps followed by a mobile communication device in some embodiments is presented. At step 305, the mobile communication device may operate a video game.

Unlike in FIG. 3A, FIG. 3B includes intervening steps 306, 307, and 309 for triggering checks for hot spot information. Requests (i.e., checks) for updated hot spot information may or may not specify particular hot spot information to check for, depending on the embodiment. For example, the mobile communication device may not know what hot spot information, if any, is available when the mobile communication device contacts the server at step 310. In some embodiments, the mobile communication device may identify a particular game, scene, and/or element for which hot spot information is desired when the mobile communication device contacts the server. In other embodiments, the mobile communication device may request updated hot spot information for several games during contact with the server at step 310.

Some of the methods for triggering a hot spot information update will now be discussed. In some embodiments, the user may manually request updated hot spot information at step 306. For example, the video game operating on the mobile communication device may include a selectable option to retrieve updated hot spot information. Selecting this option may cause the mobile communication device to immediately contact the server to check for content to download at step 310 in some embodiments. Alternatively, there may be further options, including retrieving updated hot spot information when the game ends or at some other time.

At step 307, an embodiment may request updated hot spot information upon initialization of the video game. For example, when the game is selected or otherwise initialized by the user, the mobile communication device may automatically contact the server to check for hot spot information to download at step 310. In some of embodiments with the automatic request feature, the check may not be performed automatically on every startup. For example, upon initializing the game, the mobile communication device may check how much time has passed (or how many games have been played) since the previous download before automatically contacting to the server at 310. In those embodiments, the mobile communication device may track the dates of one or more previous updates.

In some embodiments, at step 309, the mobile communication device may connect to the server to check for updated hot spot information when the time period since the last check and/or download exceeds a threshold. As previously stated, in some embodiments step 309 is combined with step 307. In other embodiments, the time period since the last update is checked at times other than upon initializing the game. For example, upon reaching a certain level or scene in the game, the mobile communication device may examine the last time the game, level, and/or scene was updated. If the time period exceeds a threshold, then the mobile device may contact the server at 310. The threshold time period between updates may vary depending upon the game and the embodiment. In some embodiments, the user may be able to increase or reduce the frequency of hot spot information updates by lowering or raising the threshold period. A user with lower bandwidth limits may not want to check for updates as often as a user who has higher bandwidth limits included in their service plan.

In other embodiments, the mobile communication device may utilize a separate scheduler program to schedule a request for updated hot spot information. When the scheduled time for checking arrives, the mobile communication device may contact the server. The video game may not be operating while the request is sent in some of those embodiments. Alternatively, at the scheduled time, the mobile communication device may launch a component of the game to request updated hot spot information from the server.

At step 310, the mobile communication device may contact the server to check for hot spot information to download. Contacting the server may be accomplished by using the network accessible by the mobile communication device in an embodiment. Some embodiments may contact the server over the Internet. In some embodiments, the server is contacted by first connecting to an interface. The interface may validate the mobile communication device as belonging to a particular service and/or confirm that the mobile communication device is configured and/or allowed to receive hot spot information, such as at step 315.

Other embodiments may not contact the server unless the user has selected a game option that allows hot spot information updates. In some of those embodiments, if the user requests a content update at step 306, the request may override current settings concerning whether hot spot information updates are allowed.

In some embodiments, when the mobile communication device contacts the server, the mobile communication device may send the server one or more version identification numbers for hot spot information currently on the mobile communication device. The server may use these version identification numbers to determine if the mobile communication device already has downloaded some or all of the hot spot information available for download. In those embodiments, sending the version identification number may help eliminate downloads of duplicative information.

In one embodiment, the server may use a checksum algorithm to determine whether the mobile communication device has already received the hot spot information. Any known algorithm for checking whether content has previously been downloaded, thus reducing download redundancy, may be used in an embodiment.

At step 315, the server in some embodiments may verify whether the mobile communication device should receive hot spot information updates before sending the updated hot spot information. This preference may be stored on the server in some embodiments.

At step 312, the mobile communication device may receive an initial message from the server. In some embodiments, this message may alert the user of available hot spot information and/or ask the user whether they wish to receive the information. For example, an embodiment may require the user to allow the updated hot spot information at step 315 in order for the updating process to continue. The initial message, presented at step 312, may be influenced by whether the server data suggests that the mobile communication device should receive updates. For example, the initial message received at step 312 could be a message specifying that the mobile communication device is not configured to receive updated hot spot information. The initial message may also describe the features of the hot spot information to aid the user in deciding whether to download the content. In addition, the initial message may specify details about the available hot spot information, such as file size, number of files, and/or estimated download time. In some embodiments, the user may setup game parameters so that this presentation and/or authorization is bypassed.

The initial message may also include information that helps the mobile communication device to internally check what available updated hot spot information is already present on the mobile communication device. In some embodiments, this may allow the mobile device to present the user with only those new features that the mobile communication device has not already implemented.

In addition, the initial message at step 312 may be promotional in nature. For example, the message may state "X would like to hide a secret within this scene. Do you accept?" Therefore, even if the user declines the update, an embodiment may still promote the third party (e.g., X) in some embodiments. Sending a promotional initial message at step 312 may also provide the game company with a means of tracking the number of times users view promotional content. This embodiment also may allow a game company to charge the advertising third party on a per-view basis. In other words, the game company may profit for each time the promotional initial message is presented to a user at step 312.

Continuing at step 317, the mobile communication device may send a follow-up request to the server. The request may include whether or not the mobile communication device should receive the updated hot spot information. For example, if the mobile device determines, at step 315, that it should not receive hot spot information, the follow-up request may alert the server to take no further action. In some embodiments, the mobile communication device may not send a follow-up request if receiving updates is disallowed. Conversely, if receiving updates is allowed, the follow-up request sent to the server at step 317 may include an indication that the updates should be sent to mobile device from the server.

In some embodiments, the follow-up request may specify which hot spot information the user wishes to download. For example, the initial message at step 312 may allow the user to select less than all of the available hot spot information for download. Additionally, the mobile communication device may already have some of the hot spot information that is available on the server, in which case the mobile communication device may not need to download that content again.

In yet another embodiment, the user may specify when to download the hot spot information. For example, the user may wish to delay the download of the hot spot information until some later time when the user is not placing calls, playing a game, or otherwise using the mobile communication device. The follow-up request may alert the server that the download may occur at some other time.

The follow-up request (or some other communication) may also allow the server to track the success of promotional messages. For instance, if a high percentage of users reject downloading of hot spot information after being presented with a particular message, the message may be ineffective.

At step 320, the mobile communication device may download hot spot information from the server. In some embodiments, this may occur while the game is operating on the mobile communication device. In other embodiments, the mobile communication device may receive the updated at some other time. As stated previously, the user may specify when the download will occur in some embodiments.

In some embodiments, the mobile communication device may recognize certain files (of hot spot information) as already downloaded to the mobile communication device. In these embodiments, the mobile communication device may automatically bypass the repeated download of this updated information.

The server may track the number of mobile communication devices that have downloaded promotional hot spots. For example, the game company may use this information to profit from each download of a third-party advertisement. The server may also track user-identification information in conjunction, which may aid in determining whether the third-party advertiser reaches a particular demographic. Appropriate security safeguards may be implemented to make sure the information is not disclosed to unauthorized individuals.

At step 325, a version identifier for the downloaded hot spot information may be saved. This identifier may be saved on the mobile communication device, the server, both, or neither, depending on the embodiment. Saving the identifier may help prevent against duplicative downloads. In embodiments where the server stores the version identifier, the version identifier may be stored in a database table in relation to a mobile communication device identification value. The identifier data may be stored on a storage medium such as described with reference to FIG. 1 (e.g., storage medium 130). In one embodiment, the mobile communication device may execute a checksum algorithm on the version identifier (and/or compare the identifier to locally-stored data) to determine whether the updated hot spot associated with the version identifier has already been downloaded. Any known algorithm for checking whether content has previously been downloaded, thus reducing download redundancy, may be used in an embodiment.

Alternatively, the mobile communication device may compare available information identifiers received from the server with version identifiers on the mobile communication device, when analyzing which files to receive.

At step 328, the mobile communication device may display the features of the downloaded hot spot information to the user. This step may be similar to the initial message step 312, in some embodiments.

At step 330, the mobile communication device may use coordinate information from existing or updated hot spot information to designate a location in-game for activating the particular hot spot. For example, the coordinates may specify a location along the horizontal axis of the screen and the vertical axis to monitor for user interaction. The location may define the boundaries of an object. In some embodiments, such as games with three-dimensional views, the coordinates may additionally specify a location along a depth axis. In other embodiments, the coordinates may specify a fixed location on the screen of the mobile communication device.

In some embodiments, the coordinates may also include scene, level, or time information for placing the hot spot in-game. For example, in the darts game illustrated in FIGS. 2A-B, different hot spots may be placed on dart board 210 when the user has been playing the game for a certain amount of time or has achieved a certain score.

In still more embodiments, the coordinates comprise a selection of one or more predefined in-game locations. For example, turning back to FIG. 2A, a first location may be the shirt 230, a second location may be poster 225, a third location may be dart board 210, and so on. In that embodiment, the coordinates need only identify the pre-defined location (rather than positions along the axes) and the mobile communication device may designate that location as activating the hot spot.

In other embodiments, the hot spot information may not include coordinates. For example, the mobile communication device may have a predefined location associated with activating the hot spot.

In some embodiments, the placement location of the hot spot is determined based on user interaction. For example, the activated content of a first hot spot may include placing a second hot spot in-game.

If the hot spot information includes and/or defines an item, the item may be displayed in-game at the designated location at step 335.

At step 337, the mobile communication device may detect activation of a hot spot via user manipulation of the hot spot location. As previously stated, the location may be an item in some embodiments. The hot spot information may specify what type of manipulation is required to activate the hot spot. For example, the user may need to cause a particular object, such as a cursor or game element, to enter into the hot spot location. In another embodiment, if the user causes a particular in-game character to touch or otherwise manipulate the hot spot location, the hot spot may be activated.

When the hot spot is activated, content may be presented to the user at step 340. The content may include a message (e.g., step 342), graphics, animation, and/or sound, depending on the embodiment. The content may be displayed at a location specified in the hot spot information.

Some embodiments include an option for the user to remove in-game hot spots. Similarly, the user may be able to restore original hot spots by selecting an option within the game, or by default in some situations. In some embodiments, this is achieved by archiving previous hot spot information on the mobile communication device. In other embodiments, hot spot information may be archived on the server for download by the mobile communication device.

Figure 4A:
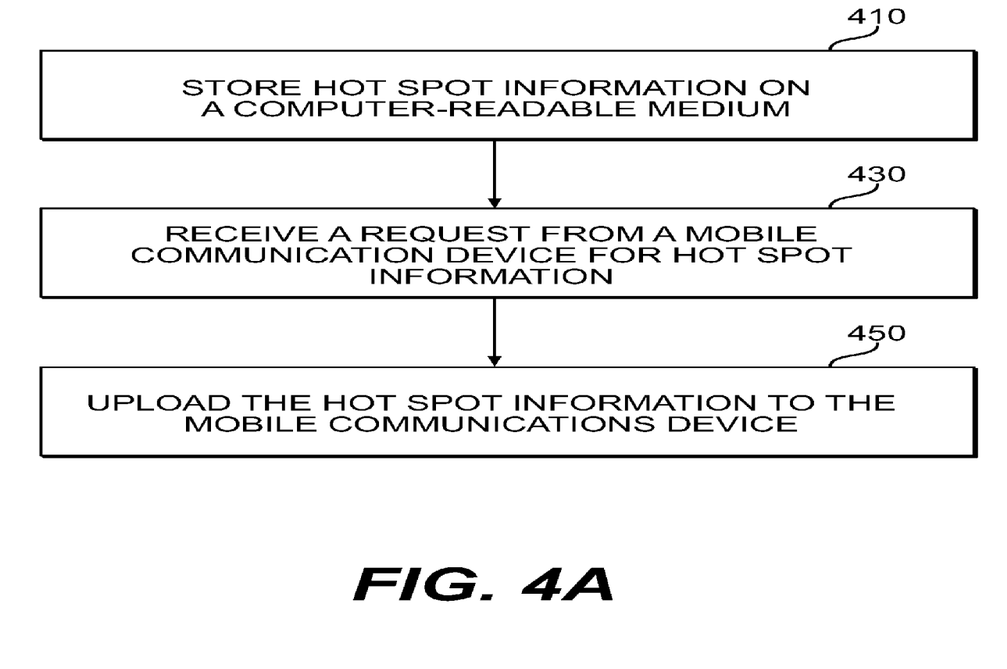
FIGS. 4A-B are exemplary flow charts that include steps taken by a server to update in-game hot spot information on a mobile communication device in accordance with an embodiment of the present invention.
Figure 4B:
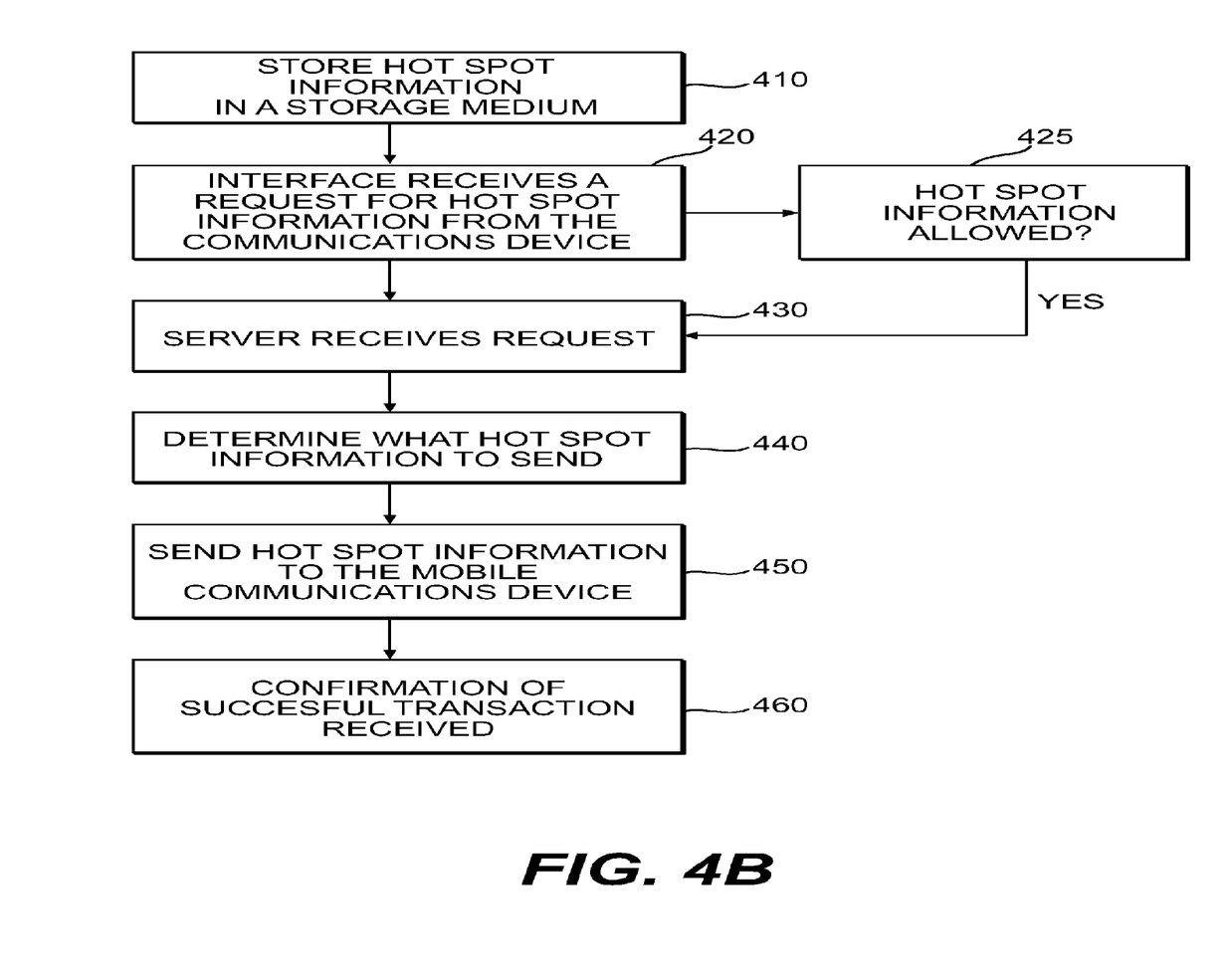

FIGS. 4A-B are exemplary flow charts that include steps taken by a server to update hot spot information on a mobile communication device in accordance with an embodiment of the present invention. Turning now to FIG. 4A, the server may store hot spot information on a computer-readable medium in some embodiments. The computer-readable medium may be the storage medium discussed with respect to FIG. 1 (e.g., storage medium 130) in some embodiments.

At step 430, the server may receive a request for hot spot information from the mobile communication device. This request may be an inquiry regarding a particular game, scene, and/or element within the game. In some embodiments, the request is an inquiry for hot spot information for multiple games. The request may also contain a version identifier that may help the server determine what hot spot information the mobile communication device has already downloaded.

At step 450, the server may upload the content to the mobile communication device. The uploaded content may include coordinates, an item, and/or other content for display after the hot spot is activated.

Turning now to FIG. 4B, a more elaborate set of steps followed by a server in some embodiments is presented. At step 410, the server may store updated hot spot information in a storage medium. In some embodiments, the updated hot spot information is indexed in a database, such as a relational database. The storage medium may be any number of types of memory or devices, such as described above with reference to FIG. 3B.

At step 420, an interface may receive a request for hot spot information from a communications device. The interface may be configured differently depending on the embodiment, and as previously discussed with respect to FIG. 1.

In some embodiments, the request may include one or more version identification numbers, as previously mentioned.

At step 425, the interface in some embodiments may verify whether the mobile communication device should receive hot spot information before sending the hot spot information. In an embodiment, the interface verifies that the mobile communication device belongs to a particular service subscription. In another embodiment, the interface may query stored data to determine whether the mobile device is configured to receive hot spot information. If the mobile communication device is configured to receive hot spot information, the interface may pass the request to the server. In some embodiments, the server will receive the request without (or regardless of) any querying by the interface. In other embodiments, the verification is handled after the server receives the request.

The server may receive the request at step 430. In some embodiments step 420 and 430 are combined.

At step 440, the server may attempt to determine what hot spot information should be sent to the mobile communication device. For example, the determination may be based on the model type of the mobile communication device, the service plan to which the mobile device belongs, the service provider that provides the plan to the mobile device, the base location of the mobile device, the current location of the mobile device, which updates the mobile device has already received, user information, preset location, and/or other criteria.

In an embodiment, the server uses the base location of the mobile communication device to provide localized promotional hot spots. For example, the server may query a database of hot spot information using the area code of the mobile communication device to promote businesses that are in or near the area code. Similarly, the mobile communication device may report its current location to the server. In some of those embodiments, the hot spot information to send to the mobile communication device may include promotional content for businesses near the mobile communication device's current location.

The server may also add an element of randomness to the selection of hot spot information in some embodiments. In these embodiments, more than one promotional hot spot may be eligible for placement in a particular in-game scene or location, and the server may choose what hot spot information to send based at least partially on chance. In another similar embodiment, the server may send content to one or more mobile communication devices on a rotational basis. For example, if hot spot information A was previously sent to a mobile communication device, hot spot information B may be sent to the next mobile communication device to contact the server. In this way, the server may take turns selecting which content to send to a mobile communication device that requests hot spot information. Alternatively, the mobile communication device may randomly select the hot spot. Additional methods of selection include the time of day, the date, and/or the level of play.

At step 450, the hot spot information may be sent to the mobile communication device. The hot spot information may be sent immediately in some embodiments, or it may be sent at some other time. In addition, some hot spot information may be sent in different download blocks. In this way, the mobile communication device may be able to incorporate some hot spot information before receiving all of the information.

The server may also track the number of times promotional hot spots are sent, as previously mentioned.

In some embodiments, at step 460, the mobile communication device may send a confirmation to the server indicating a successful transaction. In embodiments comprising a server that tracks what hot spot information the mobile communication device has already received, the server may not count the hot spot information as received until the confirmation is returned. In some embodiments, the server receives confirmation when the last of the date is transferred to the mobile communication device.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for retrieving and displaying a hot spot associated with a video game operable on a mobile communication device, comprising:
   a) contacting a server for hot spot information to download, comprising providing the server with at least one of: a game for which hot spot information is desired, a scene for which hot spot information is desired, an element for which hot spot information is desired, the model type of the mobile communication device, the service plan to which the mobile device belongs, the service provider for the mobile communications device, the base location of the mobile communication device, the current location of the mobile communication device, a version identifier for hot spot information currently on the mobile communication device, user-identification information, preset location, amount of game-play time, game score, and level of play;
   b) downloading hot spot information from the server to the mobile communication device, the hot spot information comprising:
      1) hidden content for presenting to the user when the hot spot is activated; and
      2) coordinate information;
   c) designating a non-promotional location in-game associated with activating the hot spot based on the coordinate information;
   d) displaying an object at the designated non-promotional location; and
   e) displaying the hidden content when the user activates the hot spot.

2. The method of claim 1, wherein the hidden content is promotional.

3. The method of claim 1, wherein the coordinate information comprises time information for placing the hot spot in-game.

4. The method of claim 1, wherein the coordinate information comprises one or more predefined in-game locations.

5. The method of claim 1, wherein the hot spot information further comprises an object to be displayed in-game at the non-promotional location.

6. The method of claim 1, wherein the hot spot information specifies a type of manipulation required to activate the hot spot.

7. The method of claim 1, further comprising saving on the mobile communication device a version identifier for the downloaded hot spot information.

8. The method of claim 1, wherein the hidden content comprises one or more objects selected from the group consisting of messages, graphics, animations, and sounds.

9. The method of claim 8, wherein the hidden content is promotional.

10. The method of claim 1, wherein the hidden content is displayed in a pop-up window.

11. The method of claim 1, wherein the hidden content is displayed on the mobile communication device in a website separate from the video game.

12. The method of claim 1, wherein the hidden content comprises a second hot spot.

13. A method for retrieving and displaying a hot spot associated with a video game operable on a mobile communication device, comprising:
   a) contacting a server for hot spot information to download, comprising providing the server with user-identification information;
   b) downloading hot spot information from the server to the mobile communication device, the hot spot information comprising:
      1) hidden promotional content for presenting to the user when the hot spot is activated; and
      2) coordinate information;
   c) designating a non-promotional location in-game associated with activating the hot spot based on the coordinate information;
   d) displaying an object at the designated non-promotional location; and
   e) displaying the hidden promotional content when the user activates the hot spot.

14. The method of claim 13, wherein the hidden content is promotional.

15. The method of claim 13, wherein the coordinate information comprises time information for placing the hot spot in-game.

16. The method of claim 13, wherein the hot spot information further comprises an object to be displayed in-game at the non-promotional location.

17. The method of claim 13, wherein the hot spot information specifies a type of manipulation required to activate the hot spot.

18. The method of claim 13, wherein the hidden content comprises one or more objects selected from the group consisting of messages, graphics, animations, and sounds.

19. The method of claim 13, wherein the hidden content is displayed in a pop-up window.

20. The method of claim 13, wherein the hidden content comprises a second hot spot.

* * * * *